United States Patent
Dageville et al.

(10) Patent No.: US 6,374,232 B1
(45) Date of Patent: Apr. 16, 2002

(54) METHOD AND MECHANISM FOR RETRIEVING VALUES FROM A DATABASE

(75) Inventors: Benoit Dageville, Redwood Shores, CA (US); Alexander Channing Ho, Singapore (SG); Mohammed Zait, Sunnyvale; Cetin Ozbutin, San Carlos, both of CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/103,549

(22) Filed: Jun. 24, 1998

Related U.S. Application Data

(63) Continuation-in-part of application No. 08/705,299, filed on Aug. 29, 1996, now Pat. No. 5,842,197.

(51) Int. Cl.[7] .............................................. G06F 17/30
(52) U.S. Cl. .............................. 707/2; 707/3; 707/100
(58) Field of Search ........................ 707/2, 3, 102, 707/100

(56) References Cited

U.S. PATENT DOCUMENTS

| | | | | |
|---|---|---|---|---|
| 4,631,673 A | * | 12/1986 | Haas et al. ................. | 707/100 |
| 5,204,958 A | * | 4/1993 | Cheng et al. ................. | 707/102 |
| 5,241,648 A | * | 8/1993 | Cheng et al. ................. | 707/7 |
| 5,404,510 A | * | 4/1995 | Smith et al. | |
| 5,546,571 A | * | 8/1996 | Shan et al. ..................... | 707/3 |
| 5,761,652 A | * | 6/1998 | Wu et al. ....................... | 707/2 |
| 5,842,197 A | | 11/1998 | Ho ................................. | 707/2 |
| 5,845,296 A | * | 12/1998 | Jasuja et al. ................ | 707/205 |
| 5,918,225 A | * | 6/1999 | White et al. ................... | 707/3 |
| 5,960,194 A | * | 9/1999 | Choy et al. ................. | 707/102 |

* cited by examiner

*Primary Examiner*—Jean R. Homere
(74) *Attorney, Agent, or Firm*—Ditthavong & Carlson, P.C.

(57) ABSTRACT

An index is built upon on one more columns of a database table. In order to retrieve values from the database table, a block-order scan is performed on the index by sequentially reading one or more units of contiguous blocks of the index. For a B-tree index, branch nodes in the blocks are ignored, but column values from within leaf nodes are retrieved. The column whose values are read can be determined from processing a query that references the column. The index can be partitioned so that the block-order index can be performed on only some of the index. Moreover, the block-order index scan is suitable for a table organized as an index.

30 Claims, 9 Drawing Sheets

| | ROWID | A | B | C |
|---|---|---|---|---|
| 210 | 221 | 3 | 5 | 2 |
| 212 | 235 | 6 | 3 | 3 |
| 214 | 245 | 3 | 5 | 4 |
| 216 | 156 | 2 | 3 | 7 |
| 218 | 118 | 1 | 1 | 1 |
| 220 | 246 | 4 | 8 | 2 |
| 222 | 168 | 5 | 2 | 1 |
| 224 | 124 | 7 | 4 | 7 |
| 226 | 364 | 2 | 5 | 9 |
| 228 | 123 | 8 | 7 | 6 |
| 230 | 275 | 4 | 6 | 1 |

Figure 2(a)

| | | | | |
|---|---|---|---|---|
| 218' | 118 | 1 | 1 | 1 |
| 228' | 123 | 8 | 7 | 6 |
| 224' | 124 | 7 | 4 | 7 |
| 216' | 156 | 2 | 3 | 7 |
| 222' | 168 | 5 | 2 | 1 |
| 210' | 221 | 3 | 5 | 2 |
| 212' | 235 | 6 | 3 | 3 |
| 214' | 245 | 3 | 5 | 4 |
| 220' | 246 | 4 | 8 | 2 |
| 230' | 275 | 4 | 6 | 1 |
| 226' | 364 | 2 | 5 | 9 |

Rows 218'–222' = 240'; Rows 210'–230' = 242'; Row 226' = 244'

Figure 2(b)

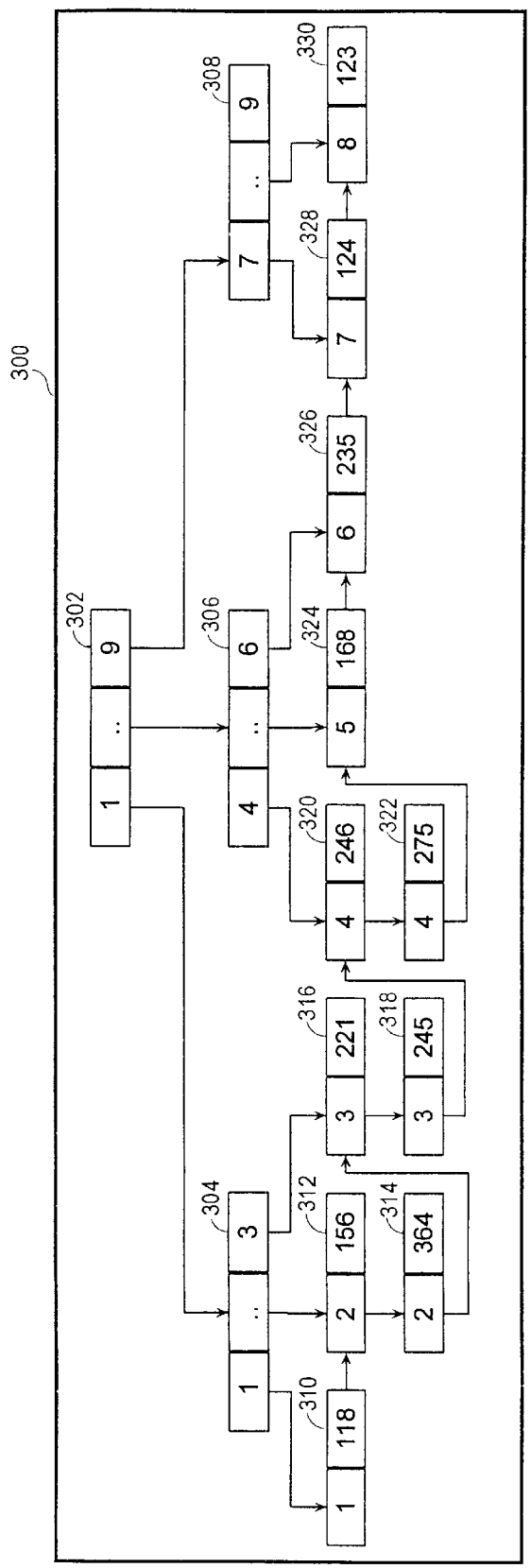

| 800 | 202 | 204 | 206 | 208 |
|---|---|---|---|---|
| | ROWID | A | B | C |
| 218 | 118 | 1 | 1 | 1 |
| 212 | 235 | 6 | 3 | 3 |
| 216 | 156 | 2 | 3 | 7 |
| 222 | 168 | 5 | 2 | 1 |
| 210 | 221 | 3 | 5 | 2 |
| 214 | 245 | 3 | 5 | 4 |
| 224 | 124 | 7 | 4 | 7 |
| 226 | 364 | 2 | 5 | 9 |
| 220 | 246 | 4 | 8 | 2 |
| 230 | 275 | 4 | 6 | 1 |
| 228 | 123 | 8 | 7 | 6 |

802: rows 218, 212, 216, 222
804: rows 210, 214, 224, 226
806: rows 220, 230, 228

Figure 8(a)

| 200' | | | | |
|---|---|---|---|---|
| 218' | 118 | 1 | 1 | 1 |
| 216' | 156 | 2 | 3 | 7 |
| 222' | 168 | 5 | 2 | 1 |
| 212' | 235 | 6 | 3 | 3 |
| 224' | 124 | 7 | 4 | 7 |
| 210' | 221 | 3 | 5 | 2 |
| 214' | 245 | 3 | 5 | 4 |
| 226' | 364 | 2 | 5 | 9 |
| 228' | 123 | 8 | 7 | 6 |
| 220' | 246 | 4 | 8 | 2 |
| 230' | 275 | 4 | 6 | 1 |

802': rows 218', 216', 222', 212'
804': rows 224', 210', 214', 226'
806': rows 228', 220', 230'

Figure 8(b)

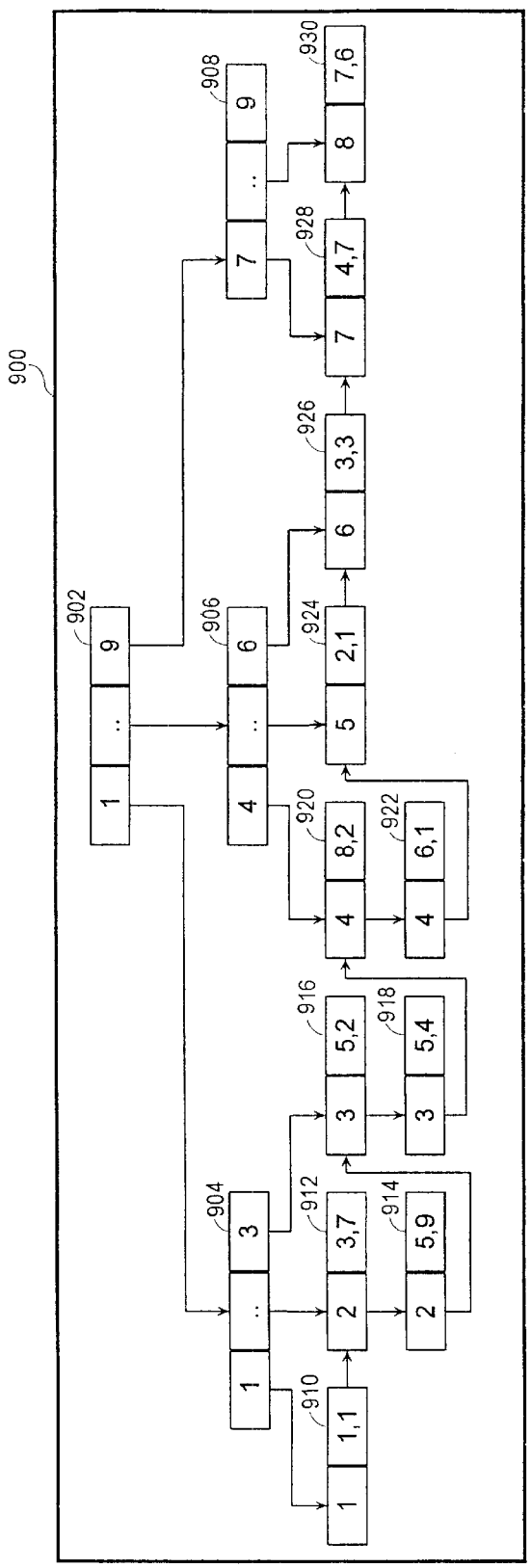
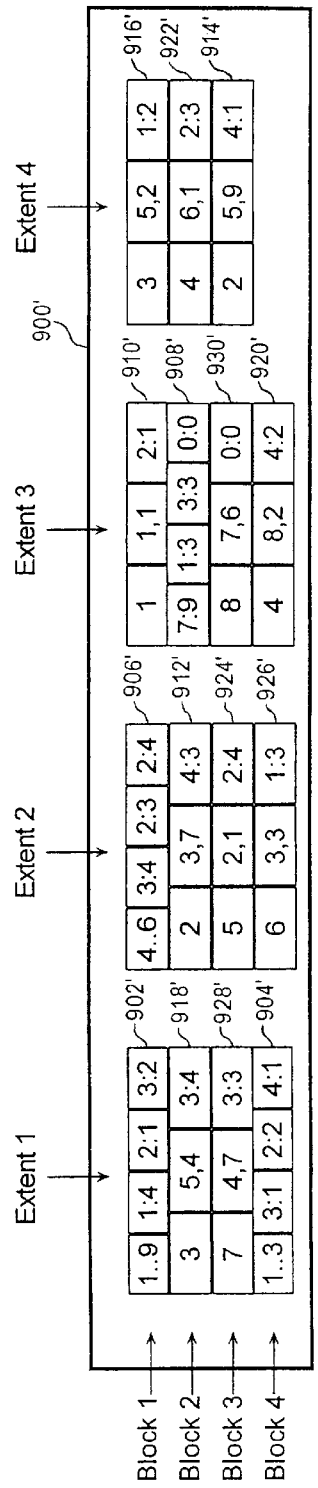
Figure 9(a)
Figure 9(b)

US 6,374,232 B1

METHOD AND MECHANISM FOR RETRIEVING VALUES FROM A DATABASE

RELATED APPLICATION

This application is a continuation-in-part of U.S. application Ser. No. 08/705,299 now U.S. Pat. No. 5,842,197 entitled "A Method and Apparatus for Creating an Index," filed on Aug. 29, 1996 by Alexander Channing Ho, the contents of which are incorporated herein by reference.

FIELD OF THE INVENTION

The present invention relates to computer systems and more particularly to efficiently retrieving information from databases.

BACKGROUND OF THE INVENTION

Relational databases store information in indexed tables that are organized into rows and columns. A user retrieves information from the tables by entering a request that is converted to queries by a database application, which then submits the queries to a database server. In response to the queries, the database server accesses the tables specified by the query to determine which information within the tables satisfies the queries. The information that satisfies the queries is then retrieved by the database server and transmitted to the database application and ultimately to the user.

FIG. 2(a) illustrates a logical layout of an exemplary table T (200) within a relational database. Table 200 comprises three user columns, column A 204, column B 206, and column C 208, and eleven rows 210–230. Table 200 also contains an internal column or pseudocolumn 202, referred to as a rowid. A table's rowid is retrievable by query and uniquely identifies a row in the table, but is not normally displayed when the structure of the table is listed. For example, a rowid of 221 uniquely identifies row 210, which contains the values of 3 in column A 204, 5 in column B 206, and 2 in column C 208. In this example, the values of the columns A 204, B 206, and C 208 are integers, but it is to be understood that columns of a database table can hold values of any of a variety of types including floating point numbers and variable length strings of characters.

For any given database application, the queries to retrieve information from a table must conform to the rules of a particular query language. Most query languages provide users with a variety of ways to specify the information to be retrieved. For example, in the Structured Query Language (SQL), the query, select A from T where A<5, requests the retrieval of the information contained in column A of specified rows of table T that satisfies a specified condition. The conditions in the where clause specify one or more predicates, in this example A<5, which must be satisfied by matching rows. In the example, rows 210, 214, 216, 218, 220, 226, and 230 of table T 200 satisfy this query because the corresponding values of column A 204 are 3, 3, 2, 1, 4, 2, and 4, respectively. On the other hand, rows 212, 222, 224, and 228 of table T 200 do not satisfy this query because the corresponding values of column A 204 are 6, 5, 7, and 8, respectively.

One approach to access the rows of a table in processing a query is called a "full table scan," in which a database server fetches every row of the table and inspects every column named in the where clause. FIG. 2(b) illustrates one possible physical layout 200' of table T wherein the corresponding row data 210'–230' is stored in one or more units (or "extents") of contiguous blocks. A block is the smallest quantity of data that can be read from a persistent store such as a disk into dynamic memory. If a database system requires any information stored in a particular block, the database system must read the entire block into memory. To retrieve values for a particular column of a table, the database system must read all the blocks that have any data from that column of the table. Since values for the column may be present in all or almost all the blocks of a table, the entire base table or significant portion thereof must be read into memory in order to retrieve the column values. This retrieval can be very costly, as the column data itself may be a small percentage of the data stored in the table.

The sizes of the blocks in the examples and figures herein are simplified for purposes of illustration. Typically, however, the size of the blocks is generally from 512 ($2^9$) bytes to 16,384 ($2^{14}$) bytes, but the size of the extents are much larger and of any size, e.g. 30 megabytes. Storing row data in contiguous blocks enables the use of efficient multi-block input/output techniques, for example allowing overhead of reading from disk storage, such as seeking to a block, to be pipelined.

Over time, as rows are added and dropped, the physical order of the row data usually does not correspond to the logical order of the rows in the table, if there is a logical order. Accordingly, the order of the row data in the blocks may appear to be random. In the example of FIG. 2(b), the first unit of contiguous blocks (extent 240') contains row data 218', 228', 224', and 216', and 222'; the second unit of contiguous blocks (extent 242') contains row data 210', 212', 214', 220', and 230'; and the third unit of contiguous blocks (extent 244') contain row data 226'.

In order to process the exemplary query select A from T where A<5, a full table scan reads all of extent 240' containing row data 218', 228', 224', and 216', and 222', all of extent 242' containing row data 210', 212', 214', 220', and 230', and the used portion of extent 244' containing row data 226'. Thus, the full table scan reads the data for all the columns in table T 200, even though only the information from column A 204 was necessary to process the query. If the amount of the data for the columns not used in the query is very large, then the full table scan methodology becomes very inefficient because of the unnecessary amount of disk input/output.

Accordingly, many database systems provide indexes to increase the speed of the data retrieval process. A database index is conceptually similar to a normal index found at the end of a book, in that both kinds of indexes comprise an ordered list of information accompanied with the location of the information. Values in one or more columns of a table are stored in an index, which is maintained separately from the actual database table.

One implementation of a database index is a B-tree, whose logical layout is illustrated in FIG. 3(a). A B-tree index is a hierarchical arrangement of two types of nodes: leaf nodes and branch nodes. Leaf nodes reside at the lowest level of the B-tree hierarchy and contain values from the actual column or columns upon which the index is built and the rowid of the corresponding rows. Leaf nodes may contain data for many rows, e.g. 100 rows, but, for purposes of example, leaf nodes are illustrated herein as containing a single row. For example, B-tree index 300, being built upon column A 204 of table T 200, has leaf nodes 310–330 collectively holding the values of column A 204. Specifically, leaf node 310 holds the value 1 from column A 204 and the rowid 118, which identifies row 218 of table T 200. As another example, leaf node 330 contains an index value of 8 from column A 220 and a rowid of 123, identifying row 228 of table T 200. Each leaf node contains a pointer or other link to the subsequent leaf node. For example, leaf node 328, which contains an index value of 7, points to leaf node 330, which contains an index value of 8.

The non-leaf nodes of a B-tree index are branch nodes. Branch nodes contain information that indicate a range of values. In the illustrated B-tree index 300, nodes 302, 304, 306, and 308 are branch nodes and therefore each corresponds to a range of values. The range of values indicated by each branch node is such that all nodes that reside below a given branch node correspond to the values that full within the range of values for the given branch node. For example, node 306 is a branch node that corresponds to the numerical range from 4 to 6. Consequently, nodes 320, 322, 324, and 326, which all reside below node 306 in the hierarchy, correspond to values that fall within the range from 4 to 6.

A database server can perform an "index range scan" on B-tree index 300 to process the exemplary query select A from T where A<5, because B-tree index 300 is built on the a column referenced in a predicate (A<5) of the where clause of the exemplary query. In an index range scan, the first leaf node within the range of values indicated by the predicate of the where clause is located, and the subsequent leaf nodes are visited until the range of values is exhausted. In this example, because the predicate is A<5, the lowest valued node in the B-tree index 300 is identified by traversing from branch node 302 to branch node 304 to leaf node 310. Beginning with the first leaf node, as long as each leaf node contains an appropriate column value that satisfies the predicate, the corresponding row is identified and the subsequent leaf node is inspected. In the example, since leaf node 310 matches the predicate, its link to the next leaf node 312 is followed. In this manner, leaf nodes 312, 314, 316, 318, 320, 322 are successively visited until leaf node 324 is reached, terminating the scan because leaf node 324 contains data for a row with a column value of 5 that does not match the predicate. Since the B-tree index 300 does not store data for the columns upon which the index is not built, and since a selected subset of the index entries are read, the index range scan, in appropriate queries, can serve to reduce the amount of data read from the disk and, hence, improve the efficiency of reading values.

One drawback to the index range scan procedure is illustrated with reference to FIG. 3(*b*), showing a physical layout 300' of B-tree index 300. After many insertions and deletions to the corresponding table, the physical order of the leaf nodes in the physical layout 300' might not correspond to the logical (sorted) order of the leaf nodes. In order to perform the above-described index range scan, the first block at Block 1 in Extent 1 (leaf node data 302') is first visited for the root branch node 302. The left-most pointer 1:4, indicating Block 4 of Extent 1, is consulted because the predicate is a less than inequality. For purposes of example, a disk pointer is presented herein as a combination of a block number and an extent number. However, in typical systems, a disk pointer also includes an offset within the block, because a block can contain data for a plurality of rows. In some database systems, a separate extent number is not used because each block within the disk or portion thereof has a unique number.

Accordingly, block 4 of the same extent 1 (block 304' at 1:4) is read, retrieving branch node 304, indicating that the first leaf node 310 is stored in block 310' at 3:1. To read the data for the leaf nodes 310–322, the following respective blocks are read in order: 310' at 3:1, 312' at 2:2, 314' at 4:3, 316' at 4:1, 318' at 1:2, 320' at 3:4, and 322' at 4:2. Therefore, traversing a B-tree index involves many random accesses to the disk, because the entries in the B-tree index are not necessarily stored in any particular order on the disk. Random access of non-contiguous blocks incurs a large amount of overhead, for example, due to the "seek time" for repositioning the head of the disk for each noncontiguous block.

SUMMARY OF THE INVENTION

There is a need for improving the efficiency of retrieving values from a column, for example while processing a query that references the column in a predicate. There also exists a need for reducing the amount of data read from a secondary storage unit such as a disk when retrieving information from a table. There is also a need for retrieving values from an index without incurring the disk input/output overhead involved in randomly accessing non-contiguous blocks.

These and other needs are addressed by the present invention, which performs a block-order scan of the index by sequentially reading one or more units of contiguous blocks of the B-tree index. Branch nodes in the blocks are ignored, and column values from within leaf nodes are retrieved. Advantageously, the overhead associated with random access of blocks as per a conventional index range scan is avoided because the seek time for accessing the next contiguous block is smaller than for accessing a non-contiguous block. In addition, reading data from an index involves less disk input/output than a conventional full table scan since the index typically stores only part of the information in the corresponding table. The index may be partitioned to reduce the amount of blocks accessed in the block-order index scan.

One aspect of the invention pertains to a computer-implemented method and a computer-readable medium bearing instructions for retrieving values from a column in a table. Accordingly, an index on the table that contains values from at least the column is identified. The index is stored in one or more units of contiguous blocks and contains within its leaf nodes the values from at least the column. Data is sequentially read from at least one of the units of contiguous blocks, and the values are retrieved for the column from the leaf nodes from the sequentially read data. For example, if the index is partitioned, then values from only selected partitions of the index need be retrieved.

Another aspect of the invention involves a computer-implemented method and a computer-readable medium bearing instructions for retrieving data stored in a table, which includes receiving a query having a predicate that references a column within the table. An index built upon at least the column is identified, and a block-order scan of at least some of the index is performed to retrieve values that belong to said column. For example, if the index is partitioned, then values from only selected partitions of the index need be retrieved.

Still another aspect of the invention relates to a computer-implemented method and a computer-readable medium bearing instructions for retrieving data from an index-organized table. The table is stored in a computer-readable medium and organized as a B-tree data structure upon at least a first column. The B-tree data structure has branch nodes and leaf nodes, in which the leaf nodes contain values for the first column and for other columns of the table. In response to receiving a query having a predicate that references the column, a block-order scan of at least some of the B-tree data structure is performed to retrieve the values for the first column. For example, if the index-organized table is partitioned, then values from only selected partitions of the index need be retrieved.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2(a) and 2(b) depict the respective logical and physical layouts of an exemplary table.

FIGS. 3(a) and 3(b) depict the respective logical and physical layouts of an exemplary index built upon a column of the table shown in FIGS. 2(a) and 2(b).

FIGS. 8(a) and 8(b) depict the respective logical and physical layouts of an exemplary partitioned table.

FIGS. 9(a) and 9(b) depict the respective logical and physical layouts of an exemplary index-organized table.

DESCRIPTION OF THE PREFERRED EMBODIMENT

A method and apparatus for efficiently retrieving values from an index are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Hardware Overview

Figure 1:
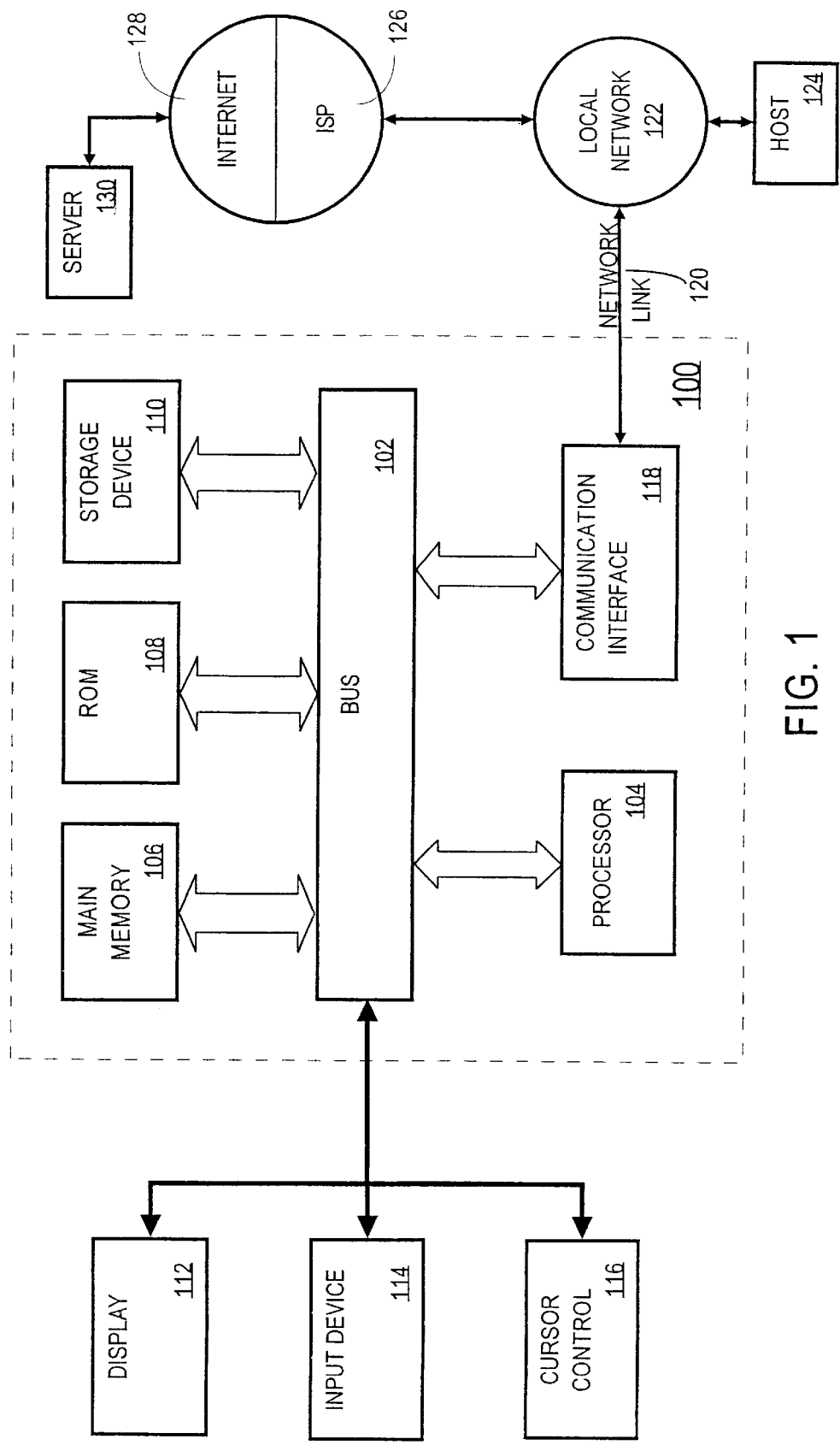
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic tape drive, a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for efficiently retrieving values from an index. According to one embodiment of the invention, efficiently retrieving values from an index is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through a worldwide packet data communication network 128, such as the "Internet." Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for efficiently retrieving values from an index as described herein.

The received code may be executed by processor 104 as it is received, and/or stored in storage device 110, or other non-volatile storage for later execution. In this manner, computer system 100 may obtain application code in the form of a carrier wave.

Block-Order Scan

U.S. application Ser. No. 08/705,299 entitled "A Method and Apparatus for Creating an Index" describes novel methods of retrieving values that belong to a column in a table. One such method involves retrieving values, such as column values for building an index, from a "qualified data repository," of which one example is an index already built upon the column in the table. As disclosed therein, data for the qualified data repository is read sequentially from the physical disk or other storage device, that is, in the order in which the data is encountered on the disk. Reading data in this sequential manner eliminates the need for the database system to seek across large portions of the storage device, thereby resulting in a faster read operation. The process of reading data sequentially from the disk is referred to herein as a "block-order scan."

Figure 4:
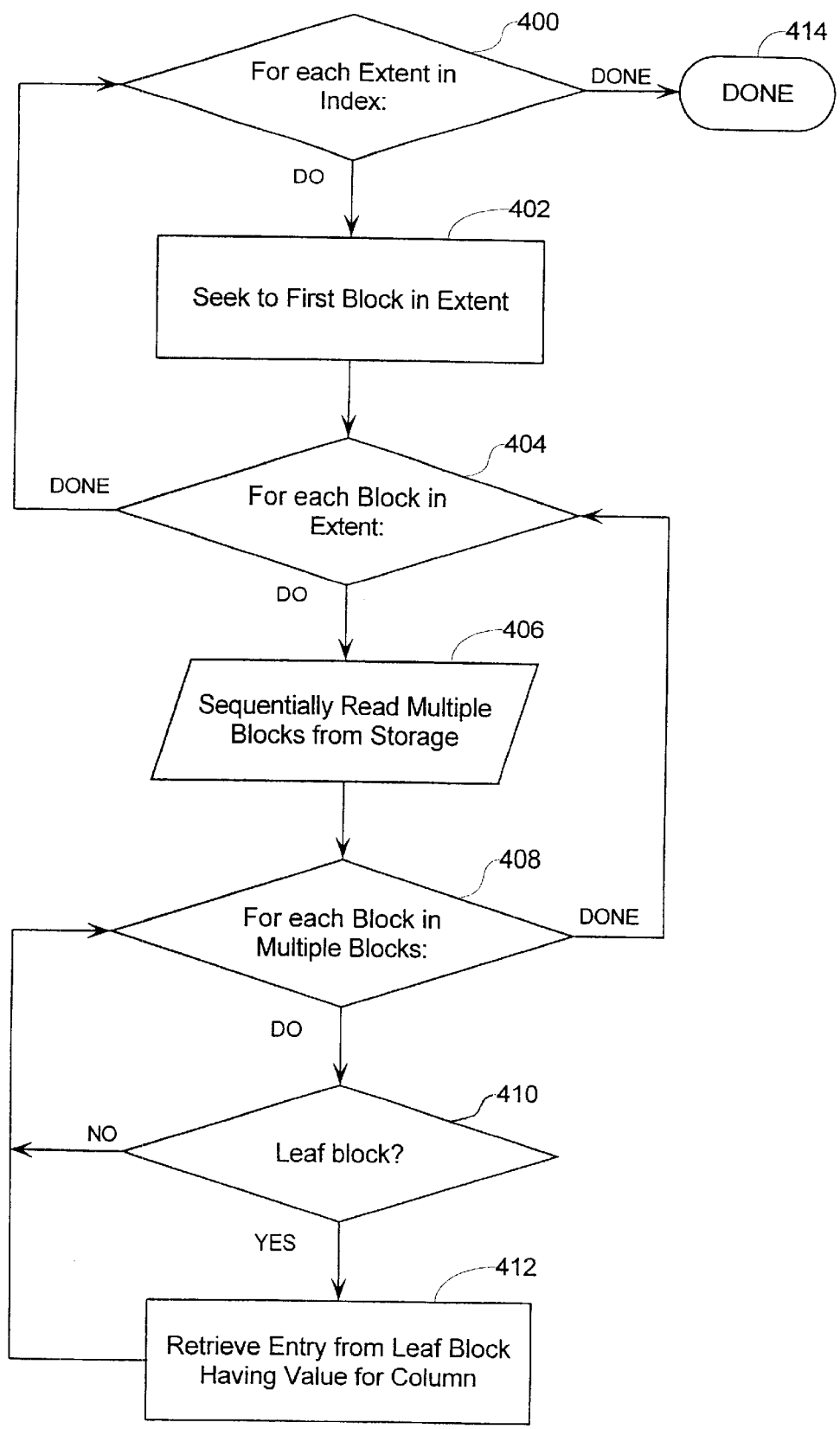
FIG. 4 is a flowchart illustrating the operation of a block-order scan of an index according to an embodiment of the present invention.

FIG. 4 is a flowchart illustrating the operation of a block-order scan of a database index. At step 400, a block-order scan iterates over the extents of contiguous blocks that collectively store all the data for the index. Typically, this extent information can be obtained from an "extent map" stored as metadata maintained by the database system to describe the logical and physical structure of the index. In other embodiments, however, the operating system may be responsible for keeping track of blocks that store the index.

At step 402, the database system via the disk controller seeks to the first block of the extent. The disk seek operation is limited to only the first block of a contiguous unit of blocks, thereby reducing the number of time-consuming disk seek operations in comparison to an index range scan. After seeking to the first block in the extent, the block-order scan iterates over the blocks in the extent, controlled by step 404. A multi-block I/O operation is used to read multiple blocks from the extent at a time (step 406). By reading multiple blocks sequentially, the controller for the storage device, e.g., a disk controller, avoids the disk seek operation and enables data to be read from a plurality of contiguous blocks with an efficient multi-block input/output operation. One benefit of multi-block input/output is the use of a high-speed memory such as DRAM (dynamic random-access memory) to cache the data, allowing subsequent blocks to be quickly retrieved.

At step 408, each block of the multiple blocks read in step 406 is iteratively examined to identify which blocks contain leaf nodes of the B-tree index and therefore column values (step 410). According to one embodiment of the present invention, the type of block is determined by checking a bit in a header section of the block, wherein the bit indicates one of two states: leaf block or non-leaf block. If the block is not a leaf block, i.e., it is a branch block, that block is skipped, causing execution to return to step 408 for another iteration. If, on the other hand, the block is a leaf block, then entries containing the column value are retrieved from the leaf block (step 412) and forms a part of the results of the block-order index scan. In an alternative implementation, leaf nodes of the B-tree index may be mixed with branch nodes of the B-Tree index in the same disk block. In this case, each node stored in the disk block is examined to determine the type of the node and, hence, whether to fetch column values therefrom.

After all the nodes in each block have been processed (controlled by step 408), execution loops back to step 404, which determines whether there is another block to process in the extent, for example by checking a "high watermark" value indicating how much of the extent is actually used. If there is another such block, then the next group of multiple contiguous blocks is sequentially read from the current extent (step 406) and the nodes in the block are processed (steps 408 through 412). If, on the other hand, all the available blocks in the extent have been read and processed, then execution loops back step 400, which determines whether there is another extent to be processed, for example by checking the extent map. Each subsequent extent is processed by seeking to the first block in the extent (step 402) and processing all the blocks (steps 404 through 412). When all the nodes in all the blocks of all the extents storing the B-tree index have been processed, the block-order scan is complete (step 414).

Unlike an index range scan, a block-order index scan be parallelized, because the order in which the extents of contiguous blocks are accessed is not critical for a block-order index scan. In an embodiment of present invention, the database server on a computer system having a plurality of processors can be configured to assign or spawn parallel processes for sequentially reading the data from blocks of each extent. Thus, by performing steps 402–412, or even steps 406–412, in parallel, different processors can simultaneously retrieve values from the index.

Block-Order Scan as an Access Method

A block-order index scan can be used as an access method for processing queries with a predicate. An access method specifies how rows from a table are identified (e.g., by producing a list of rowids) from a qualified data repository such as a table or an index according to one or more predicates of a where clause of a SQL query. Thus, a block-order scan index scan implements an access method for a predicate that references the column upon which an index was built.

Figure 5:
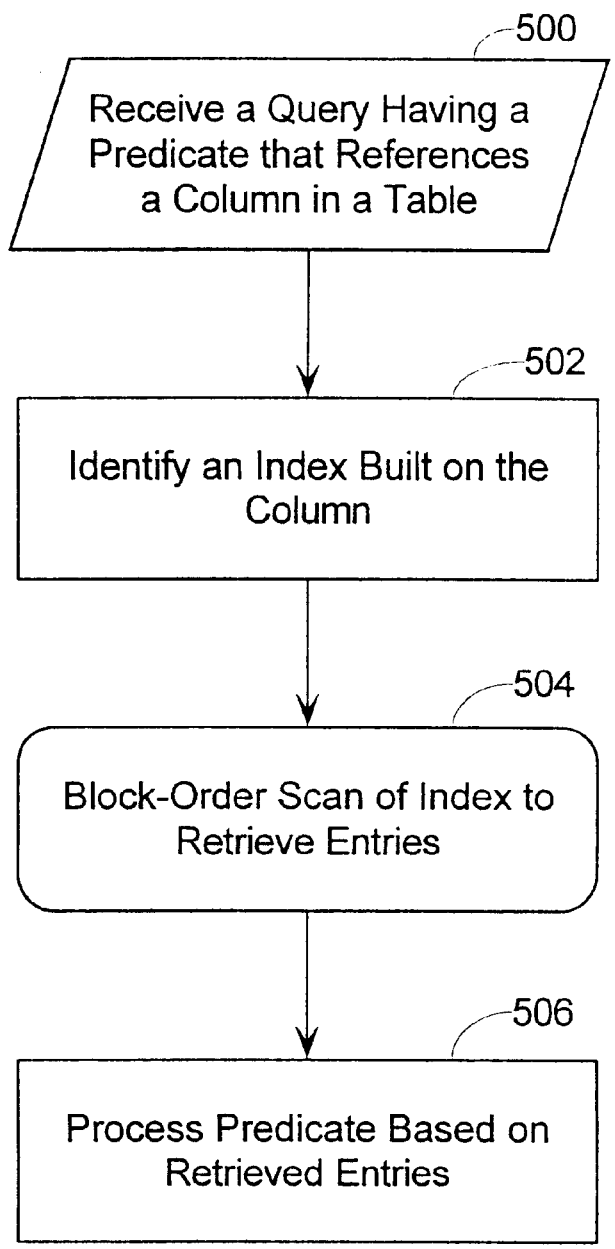
FIG. 5 is a flowchart illustrating the operation of using a block-order scan as an index access method for a query with a predicate according to another embodiment of the present invention.

FIG. 5 is a flowchart illustrating the operation of using a block-order index scan as an index access method, according to one embodiment of the present invention, for index 300 when processing an exemplary query, select A from T where A<5. Index 300, depicted in FIGS. 3(*a*) and 3(*b*), is built upon column A 204 of table T 200 of FIGS. 2(*a*) and 2(*b*). At step 500, the database server receives a query having a predicate that references a column in a table. In the working example, query select A from T where A<5 is such a query because the predicate A<5 references upon column A 204 of table T 200.

At step 502, an index that is built upon the column of the table is identified. Typically, a database server accesses metadata from the data dictionary that describes the logical and physical layout of the index, including those columns upon which the index has been built. In the working example, index 300, built upon column A 204 of table T 200, qualifies as such an index. Since indexes can be built upon multiple columns of a table, it is possible for many indexes to be built upon an particular column, in conjunction with zero or more other columns, and, hence, for many indexes to be identified.

Various techniques may be employed in accordance with the present invention to choose which index to use, including arbitrary approaches such as using the first index found, however the present invention is not limited to any particular technique. According to one embodiment of the present invention, however, the index is chosen by a cost-based analysis that estimates the amount of computing resources required to perform a block-order index scan on a candidate index. One cost metric is the ceiling of the integral quotient of the number of blocks in the index that is scanned over the number of blocks that can be read in a multi-block input/output operation, summed over each extent. For example, if four blocks can be read in one multi-block I/O operation, then the cost metric of index 300' would be 4.

In fact, a cost-based analysis can be used to select a block-order index scan as an access method among alternative access methods such as a full table scan and an index range scan. One suitable cost metric for a full table scan is the ceiling of an integral quotient of the number of blocks in the table that is scanned over the number of blocks of a multi-block I/O operation. Since there is no guarantee that related nodes are found in the same block, a suitable cost metric for an index range scan is a sum of the number of branch nodes that need to be traversed to reach the first leaf node plus the number of remaining leaf nodes that need to be read. These access methods can be combined to generate an access path as described in more detail in the commonly-assigned, co-pending U.S. patent application Ser. No. 08/808,094 entitled "Index Selection for an Index Access Path" filed on Feb. 28, 1997 by Hakan Jakobsson, Michael Depledge, Cetin Ozbutin, and Jeffrey I. Cohen, the contents of which are incorporated herein by reference. For example, assuming that the number of blocks is 4, then the cost metric for the full table scan of table 200 for the exemplary query is 5 and the cost metric for the index range scan of index 300' is 10. Therefore, the block-order scan with a cost metric of 4 is chosen as the access method in this example.

With continued reference to FIG. 5, after the index built upon the column of the table is identified (step 502), a block-order scan of the index is performed to retrieve entries from the index (step 504). In the working example, since index 300, built upon column A 204 of table T 200, was identified in step 502, a block-order scan of index 300 is then performed in step 504.

Referring back to FIG. 4, the block-order scan of index 300 starts at step 400 by iterating over the extents of contiguous blocks that store the data of index 300. In the working example, index 300 comprises four extents (Extent 1, Extent 2, Extent 3, and Extent 4). In the first iteration of the loop controlled by step 400, the block-order index scan causes a disk seek to Block 1 of Extent 1 (step 402). Iterating over the blocks of Extent 1 (step 404), the block-order index scan sequentially reads Block 1, Block 2, Block 3, and Block 4 in a single multi-block I/O operation (step 406). This group of blocks is processed to extract the individual blocks (step 408), in this example blocks 302', 318', 328', and 304'. The branch blocks 302' and 304' (checked in step 410) are ignored, but entries of leaf blocks 318' and 328' are retrieved having column values 3 and 7, respectively. In subsequent iterations, the remaining extents, Extent 2, Extent 3, and Extent 4, are processed (step 400) by seeking to the first blocks thereof (step 402) and sequentially reading the constituent blocks (step 406). This processing results in ignoring branch blocks 306' and 308' and retrieving entries from leaf blocks 312', 324', 326', 310', 330', 320', 316', 322',and 314'. In contrast with the index range scan, although all the branch blocks and leaf blocks contain disk pointers, these disk pointers are not used in the block-order index scan. Rather, the block-order index scan reads each block in the order the block occurs on the storage medium.

Referring back to FIG. 5, the predicate is evaluated based on the retrieved entries (step 506). According to one embodiment of the invention, the column values from the retrieved entries are used to evaluate the predicate. In the working example of the predicate A<5, the values of column A 204 are compared against the value of 5. In this example, entries 318', 312', 310', 320', 316', 322', and 314' satisfy the predicate, but entries 328', 324', 326', and 330' do not satisfy the predicate.

According to another embodiment of the present invention, when the where clause further references columns upon which the index was not built, the rowids from the retrieved entries are used to look up entries in the underlying table to evaluate the query. For example, with the query select A from T where A<5 and B=5, the retrieved rowids are used to look up column values in the table T 200. Since entries 318', 312', 310', 320', 316', 322', and 314' satisfy the first predicate A<5 in the where clause, rowids from entries 318', 312', 310', 320', 316', 322', and 314' are used to look up values of column B 206 of table T 200. The rowids, which are 245, 156, 118, 246, 221, 275, and 364, respectively, uniquely identify respective rows 218, 212, 210, 220, 216, 222, and 214 of table T 200. Consequently, this embodiment of the present invention is capable of determining that rows 210, 214, and 226 match the predicate because the value of column B 206 is equal to 5.

Block-Order Scan of Partitioned Indexes

Bodies of data such as relational database tables, indexes, or other data repositories may be subdivided into a plurality of disjoint subsets of data called partitions. One illustration is partitioning a table along one or more columns into distinct ranges. FIG. 8(*a*) depicts a logical layout 800 of the exemplary table T 200 partitioned on the basis of column B 206 into three partitions 802, 804, and 806. Partition 802, in this example, is arranged to hold those row whose column B 206 values are less than 4, viz. rows 218, 212, 216 and 222. Partition 804 contains rows with column B 206 values between 4 and 6, inclusive, i.e., rows 210, 214, 224, and 226; and partition 806 includes rows 220, 230, and 228, because those rows contain column B 206 values greater than 6. Tables can be partitioned upon creation or later by an administrative command, and information about the logical and physical layouts of partitioned indexes can be stored as metadata about the table in the data dictionary.

FIG. 8(*b*) illustrates a physical layout 800' corresponding to the logical layout 800 of partitioned table T 200. Physical layout 800' reflects the partitioning of the logical layout 800, by storing each of the partitions 802, 804, and 806 in a respective extent (or extents if a partition is larger than the size of one extent). Thus, partitions can be stored in different areas of the storage device and even on different storage devices to reduce contention for the storage device controller. In fact, partitions can be even distributed to different sites in a computer network to reduce CPU contention.

Serial column data is particularly advantageous for partitioning data into distinct ranges, because it allows a block-order table scan to be performed only on the partitions that can possibly satisfy the query. For example, given a query of select * from T where B=2, it is only necessary to perform a block-order scan of extent 802', which corresponds to partition 802, wherein all rows whose column B 206 values that are less than 4 are stored. Partitions 804 and 806, on the other hand, do need to be scanned, because they cannot satisfy the predicate (B=2). Accordingly, partitioning provides a benefit of reducing the amount of processing a block-order table scan.

Since partitioning affects the underlying physical representation of a body of data, it is evident that partitioning the body of data can be performed only on a single permutation of selected columns. For example, if table T 200 is partitioned on the basis of column B 206, that partitioning does not provide comparable reductions in computer time for processing the exemplary query of select A from T where A<5. Referring to FIG. 8(*a*), this query is satisfied by rows from every partition: rows 218 and 216 of partition 802, rows 210, 214, and 226 of partition 804, and rows 220 and 230 of partition 806. Consequently, a block-order table scan of table T 200, partitioned on column B 206, needs to scan every partition 802, 804, and 806 to process a query referencing column A 204.

Figure 7A:
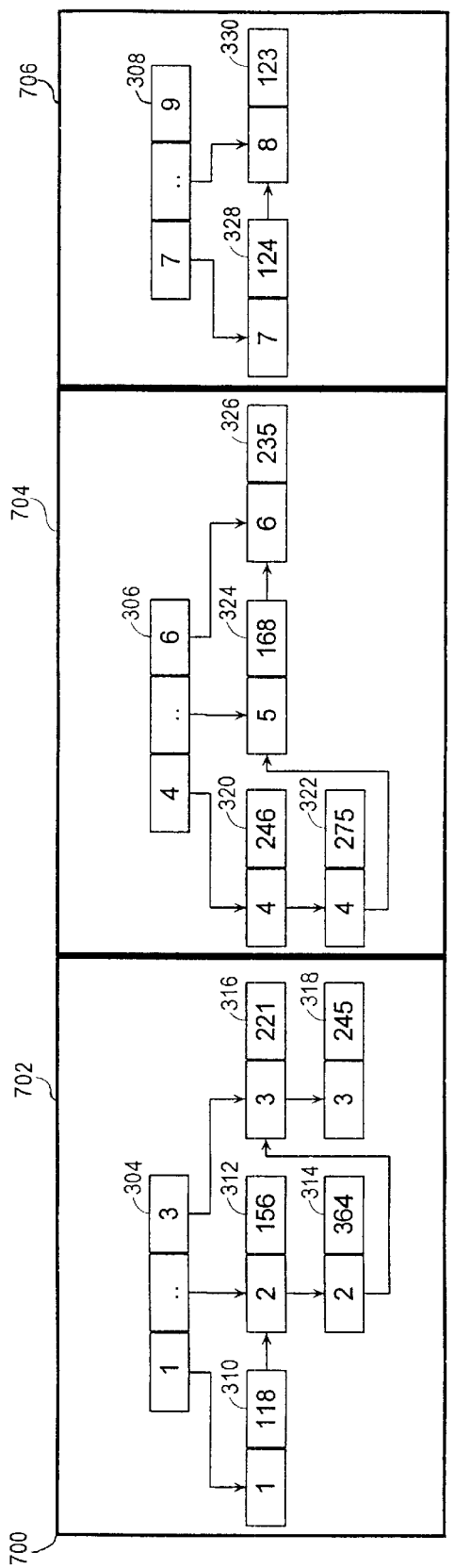
FIGS. 7(a) and 7(b) depict the respective logical and physical layouts of an exemplary partitioned index.
Figure 7B:
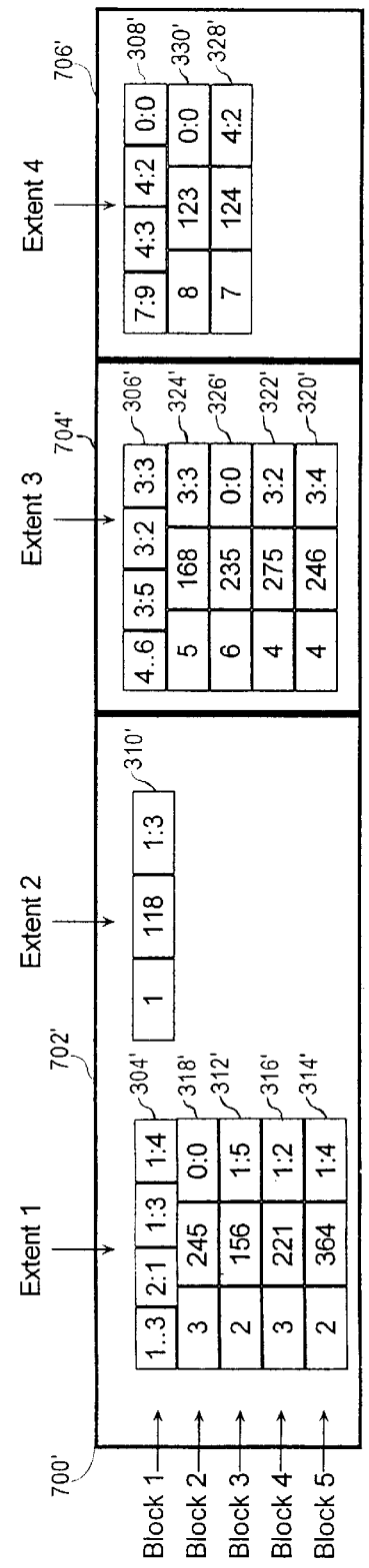

Therefore, it is desirable to provide comparable benefits from partitioning a table even though a query may reference a column that is not the basis of the partitioning. In accordance with an embodiment of the present invention, an index built upon one or more columns of the table is subdivided into a plurality of disjoint sub-indexes. Referring to FIG. 7(*a*), depicted is a logical layout 700 of an index 300 built on column A 204 of table T 200 and partitioned along column A 204. The exemplary partitioned index logical layout 700 comprises three disjoint sub-indexes or index partitions 702, 704, and 706, although the present invention is not limited to any particular number of partitions. Each index partition 702, 704, and 706 stores index entries for particular ranges of values. In the exemplary index partitioning 700, index partition 702 stores values less than 4, index partition 704 stores values between 4 and 6 inclusive, and index partition 706 stores values greater than 6.

Referring to FIG. 7(*b*), each index partition 702, 704, and 706 is stored in one or more non-overlapping respective sets 702', 704', and 706' of extents, i.e., units of contiguous blocks storing data belonging to the respective index partition. Thus, set 702' includes Extent 1 and Extent 2 for storing data belonging to index partition 702; set 704' includes Extent 3 for storing data belonging to index partition 704; and set 760' includes Extent 4 for storing data belonging to index partition 706. Thus, each index partition 702, and 704, and 706 are stored as a complete, self-contained index. Information about the logical and physical layouts of partitioned indexes is preferably stored as metadata about the index in the data dictionary.

Figure 6:
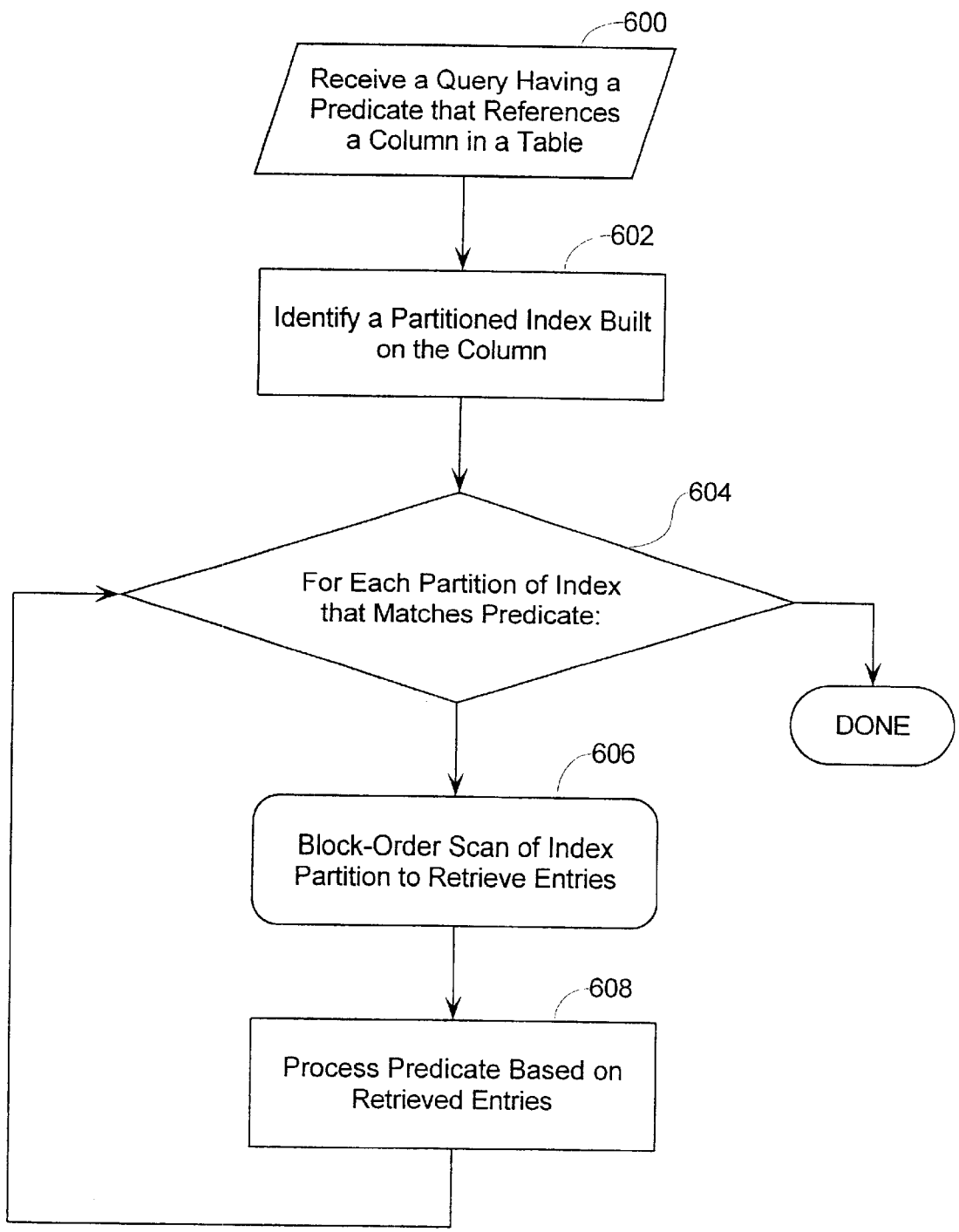
FIG. 6 is a flowchart illustrating the operation of using a block-order scan on a partitioned index according to another embodiment of the present invention.

Partitioning an index into a plurality of sub-indexes or index partitions enables the amount of data read in a block-order index scan to be reduced. Referring to FIG. 6 in accordance with one embodiment of the present invention, a query is received having a predicate that references a column in a table (step 600). For example, a database server receives an exemplary query select A from T where A<5, which contains a predicate (A<5) that references column A 204 of table T 200. At step 602, a partitioned index built upon the column referenced in the query is identified, which, in this example, is partitioned index 700, built upon column A 204 of table T 200.

At step 604, the partitions of the index are pruned so that only the partitions of the index that store column values capable of matching the predicate are examined. More specifically, the range of values in the predicate is examined to determine if it overlaps ranges of the values assigned to each partition. In the example, only index partition 702, storing column values less than 4, and index partition 704, storing columns values between 4 and 6 inclusive, qualify. On the other hand, index partition 706, storing column values greater than 6, does not qualify. Accordingly, index partition 706 is skipped because index partition 706 cannot return column values that satisfy the exemplary predicate (A<5). Consequently, this embodiment of the present invention provides a further benefit of reducing disk I/O costs, because a lesser amount of data is read from disk.

Each qualifying index partition, in this example, index partition 702 and index partition 704, is then the object of a block-order index scan (step 606). Specifically, the block-order index scan of an index partition performs the steps shown in FIG. 4, but only for the extents that store data for the index partition. Thus, a block-order index scan of index partition 702 applies to Extent 1 and Extent 2 of set 702', and a block-order index scan of index partition 704 applies to Extent 3 of set 704'. The index entries retrieved from the block-order index scan of the index partitions are used for processing the query, including evaluating the query (step 608).

Therefore, index partitioning for one permutation of selected columns advantageously reduces the amount of the input/output to and from a secondary storage device. Since the underlying table can be partitioned according to a different set of partitioning criteria, i.e. another permutation of columns, the benefits applicable to partitioning are attainable over a wider range of queries. Furthermore, reading from each extent is parallelizable, and storing index partitions in different areas of the storage device, on different storage devices, and even on different network sites reduces contention for the storage device controller.

Block-Order Scan of Index-Organized Tables

One embodiment of the present invention is applicable to index-organized tables. An index-organized table is a body of data that is logically arranged into rows and columns as a table, but physical stored as an index. Specifically, an index-organized table, like a pure B-tree index, is built on one more columns, preferably containing serial data, but stores the remaining column data in the leaf nodes in place of the rowid information.

Referring to FIG. 9(*a*), depicted is a logical view of an index-organized table 900 corresponding to the exemplary table T 200 and organized as an index built on column A 204. Accordingly, index-organized table 900 contains branch nodes 902–908 and leaf nodes 910–930. Leaf node 910, corresponding to row 218 of table T 200, by way of example, contains a value of 1 for column A 204 as the column value upon which the index-organized table was built. In the place of the rowid portion of the leaf node 910 are the values of 1 and 1 for the remaining columns of table T 200, i.e., column B 206 and column C 208. The physical layout 900' of index-organized table 900 in FIG. 9(*b*) is very much similar to the physical layout 300' of index 300 in FIG. 3(*b*), except that the data 910'–930' for the leaf nodes 910–930 contain the remaining column values instead of the rowids. For example, the leaf node data 910' for leaf node 910 at Extent 3 and Block 1 contain the remaining column values 1 and 1 for columns B 206 and C 208, respectively.

A conventional index-range scan is suitable for performing "point lookup" queries, which test a particular column value for equality to a prescribed value, when the table is organized upon that column. For queries, such as range queries, which test a column value for an inequality, and point lookup queries on a column that is not the organizing column, a block-order index scan may be more efficient. Applying a similar methodology to what is shown in FIG. 4, a block-order index scan of an index-organized table retrieves values by sequentially reading data from one or more units of contiguous blocks and inspecting the leaf nodes. Index-organized tables can also be partitioned for reducing device contention and improving parallelizability.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of retrieving values that belong to a column in a table, said method comprising the computer-implemented steps of:

identifying an index built upon at least said column of said table and stored in one or more units of contiguous blocks, said index containing said values from at least said column within leaf nodes;

sequentially reading data from the one or more units of contiguous blocks; and retrieving said values for said column from said leaf nodes in said sequentially read data.

2. The method of claim 1, further comprising the step of identifying said column from which said values are to be retrieved from said table by processing a query having a predicate that references said column.

3. The method of claim 2, further comprising the steps of:

determining another column in said table to fetch values from based on said predicate, said predicate further referencing said other column;

retrieving row identifiers from said sequentially read data; and retrieving values for said other column from said table based on said row identifiers.

4. A method of retrieving data stored in a table, said method comprising the computer-implemented steps of:

receiving a query having a predicate that references a first column within said table; identifying an index built upon at least said first column of said table; and performing a block-order scan of at least some of said index to retrieve values that belong to said first column.

5. The method of claim 4, wherein the step of performing a block-order scan of at least some of said index to retrieve values that belong to said column includes the steps of:

identifying one or more units of contiguous blocks that stores said at least some of said index;

sequentially reading data from said one or more units of contiguous blocks; identifying leaf nodes from said sequentially read data; and retrieving said values that belong to said first column from said leaf nodes identified in said sequentially read data.

6. The method of claim 5, further comprising the computer-implemented steps of:

determining a second column in said table upon which said index is not built, but which is referenced in said predicate;

retrieving row identifiers from said sequentially read data; and retrieving values for said second column from said table based on said row identifiers.

7. The method of claim 6, further comprising the step of subdividing said index into a plurality of sub-indexes based on values stored for said first column;

wherein the step of identifying one or more units of contiguous blocks that contain said values for at least said first column includes the steps of:

identifying a selected sub-index from said plurality of sub-indexes based on said predicate; and identifying said one or more units of contiguous blocks based on said selected sub-index.

8. The method of claim 7, further comprising the step of subdividing said table into a plurality of partitions based on values stored for a third column.

9. A method of retrieving data from a table, said method comprising the computer implemented steps of:
storing said table in a computer-readable medium as a B-tree data structure built upon at least a first column of said table, said B-tree data structure having branch nodes and leaf nodes, wherein said leaf nodes contain values for said first column and for one or more other columns of said table; and
in response to receiving a query having a predicate that references said column of said table, performing a block-order scan of at least some of said B-tree data structure to retrieve values for said first column.

10. The method of claim 9, wherein the step performing a block-order scan of at least some of said B-tree data structure to retrieve values for said column includes the steps of:
identifying one or more units of contiguous blocks in said computer-readable medium used to store said at least some of said B-tree data structure;
sequentially reading data from said one or more units of contiguous blocks;
identifying leaf nodes from said sequentially read data; and
retrieving said values that belong to said column from said leaf nodes identified in said sequentially read data.

11. The method of claim 10, further comprising the step of subdividing said table into a plurality of partitions based on values stored for said column;
wherein the step of identifying one or more units of contiguous blocks in said computer-readable medium used to store said at least some of said B-tree data structure includes the steps of:
identifying a selected partition from said plurality of partition based on said predicate; and
identifying said one or more units of contiguous blocks based on said selected partition.

12. A computer-readable medium bearing instructions for retrieving values that belong to a column in a table, said instructions arranged, when executed, to cause one or more processors to perform the steps of:
identifying an index built upon at least said column of said table and stored in one or more units of contiguous blocks, said index containing said values from at least said column within leaf nodes;
sequentially reading data from the one or more units of contiguous blocks; and
retrieving said values for said column from said leaf nodes in said sequentially read data.

13. The computer-readable medium of claim 12, wherein said instructions are further arranged to cause said one or more processors to perform the step of identifying said column from which said values are to be retrieved from said table by processing a query having a predicate that references said column.

14. The computer-readable medium of claim 13, wherein said instructions are further arranged to cause said one or more processors to perform the steps of:
determining another column in said table to fetch values from based on said predicate, said predicate further referencing said other column;
retrieving row identifiers from said sequentially read data; and
retrieving values for said other column from said table based on said row identifiers.

15. A computer-readable medium bearing instructions for retrieving data stored in a table, said instructions, when executed, arranged for causing one or more processors to perform the steps of:
receiving a query having a predicate that references a first column within said table;
identifying an index built upon at least said first column of said table; and
performing a block-order scan of at least some of said index to retrieve values that belong to said first column.

16. The computer-readable medium of claim 15, wherein the step of performing a block-order scan of at least some of said index to retrieve values that belong to said column includes the steps of:
identifying one or more units of contiguous blocks that store said at least some of said index;
sequentially reading data from said one or more units of contiguous blocks;
identifying leaf nodes from said sequentially read data; and
retrieving said values that belong to said first column from said leaf nodes identified in said sequentially read data.

17. The computer-readable medium of claim 16, wherein said instructions are further arranged to cause said one or more processors to perform the steps of:
determining a second column in said table upon which said index is not built, but which is referenced in said predicate;
retrieving row identifiers from said sequentially read data; and retrieving values for said second column from said table based on said row identifiers.

18. The computer-readable medium of claim 17, wherein said instructions are further arranged to cause said one or more processors to perform the step of subdividing said index into a plurality of sub-indexes based on values stored for said first column;
wherein the step of identifying one or more units of contiguous blocks that contain said values for at least said first column includes the steps of:
identifying a selected sub-index from said plurality of sub-indexes based on said predicate; and
identifying said one or more units of contiguous blocks based on said selected sub-index.

19. The computer-readable medium of claim 18, wherein said instructions are further arranged to cause said one or more processors to perform the step of subdividing said table into a plurality of partitions based on values stored for a third column.

20. A computer-readable medium bearing instructions for retrieving data from a table, said instructions, when executed, arranged to cause one or more processors to perform the steps of:
storing said table in a computer-readable medium as a B-tree data structure built upon at least a first column of said table, said B-tree data structure having branch nodes and leaf nodes, wherein said leaf nodes contain values for said first column and for one or more other columns of said table; and
in response to receiving a query having a predicate that references said first column of said table, performing a block-order scan of at least some of said B-tree data structure to retrieve values for said first column.

21. The computer-readable medium of claim 20, wherein the step performing a block-order scan of at least some of said B-tree data structure to retrieve values for said column includes the steps of:

identifying one or more units of contiguous blocks in said computer-readable medium used to store said at least some of said B-tree data structure;

sequentially reading data from said one or more units of contiguous blocks;

identifying leaf nodes from said sequentially read data;

retrieving said values that belong to said column from said leaf nodes identified in said sequentially read data.

22. The computer-readable medium of claim 21, wherein said instructions are further arranged to cause said one or more processors to perform the step of subdividing said table into a plurality of partitions based on values stored for said column;

wherein the step of identifying one or more units of contiguous blocks in said computer-readable medium used to store said at least some of said B-tree data structure includes the steps of:

identifying a selected partition from said plurality of partition based on said predicate; and identifying said one or more units of contiguous blocks based on said selected partition.

23. The method of claim 1, wherein the step of sequentially reading data includes the step of sequentially reading the data from one or more units of a plurality of physically contiguous blocks of a storage device.

24. The method of claim 5, wherein the step of sequentially reading data includes the step of sequentially reading the data from one or more units of a plurality of physically contiguous blocks of a storage device.

25. The method of claim 10, wherein the step of sequentially reading data includes the step of sequentially reading the data from one or more units of a plurality of physically contiguous blocks of a storage device.

26. The computer-readable medium of claim 12, wherein the step of sequentially reading data includes the step of sequentially reading the data from one or more units of a plurality of physically contiguous blocks of a storage device.

27. The computer-readable medium of claim 16, wherein the step of sequentially reading data includes the step of sequentially reading the data from one or more units of a plurality of physically contiguous blocks of a storage device.

28. The computer-readable medium of claim 21, wherein the step of sequentially reading data includes the step of sequentially reading the data from one or more units of a plurality of physically contiguous blocks of a storage device.

29. The method of claim 1, wherein said leaf nodes are in an unsorted order.

30. The computer-readable medium of claim 12, wherein said leaf nods are in an unsorted order.

* * * * *

UNITED STATES PATENT AND TRADEMARK OFFICE
CERTIFICATE OF CORRECTION

PATENT NO.    : 6,374,232 B1
DATED         : April 16, 2002
INVENTOR(S)   : Dageville et al.

It is certified that error appears in the above-identified patent and that said Letters Patent is hereby corrected as shown below:

<u>Title page,</u>
Item [75], Inventors, the name of the fourth named inventor should read as follows:
-- Cetin Ozbutun --

Signed and Sealed this

Thirtieth Day of March, 2004

JON W. DUDAS
*Acting Director of the United States Patent and Trademark Office*